United States Patent

Maurizio

[11] Patent Number: 5,196,084
[45] Date of Patent: Mar. 23, 1993

[54] JOINING MACHINE FOR CONTINUOUS LOOP ABRASIVE BANDS

[75] Inventor: Alfieri Maurizio, Turin, Italy

[73] Assignee: Alfieri S.n.c. Di Alfieri Paola & C., Turin, Italy

[21] Appl. No.: 825,280

[22] Filed: Jan. 24, 1992

[30] Foreign Application Priority Data

Jan. 24, 1991 [IT] Italy ............... A/91 000041

[51] Int. Cl.⁵ ............................................. B30B 1/02
[52] U.S. Cl. .................................................. 156/583.5
[58] Field of Search .................. 156/502, 580, 583.1, 156/583.5

[56] References Cited

U.S. PATENT DOCUMENTS 4,865,675  9/1989  Yamamoto .................. 156/583.1

*Primary Examiner*—Bernard Nozick
*Attorney, Agent, or Firm*—Oblon, Spivak, McClelland, Maier & Neustadt

[57] ABSTRACT

A machine for joining continuous loop abrasive bands comprising a structure permitting the assembly work inside the structure itself and a device, mounted on the said structure, which is able to exert the necessary compression for joining the surfaces to be glued by means of rotating elements that convey the piece during the working process until the expulsion of the same at the end of the operation, thus eliminating idle time.

11 Claims, 2 Drawing Sheets

JOINING MACHINE FOR CONTINUOUS LOOP ABRASIVE BANDS

BACKGROUND OF THE INVENTION

1. Field of the Invention

This invention relates to a machine for joining through compression, of continuous loop abrasive bands produced with flexible support material such as paper, fabric, paper plus fabric, vulcanized fiber laminated polymers or other materials.

DISCUSSION OF THE BACKGROUND

It is known that the aforesaid joining may be done by gluing the ends of a strip of abrasive material which, after suitable preliminary operations of chamfering, applying the adhesive, etc. are assembled, for example by overlapping or joining the extremities using material to reinforce the joint. In the next stage of the joining compression is applied which may be done by inserting manually or mechanically the relevant part of the band in a static gooseneck or "portal" press. The press, however, operated hydraulically, pneumatically, mechanically or otherwise, comprises a moving element which presses the joint area against a fixed surface and maintains the necessary pressure for a few seconds. In other types of presses the moving surface in contact with the area to be joined receives pressure from a moving element (carriage) which, by moving backwards and forwards, transmits the pressure, through one or more rollers, to the aforesaid moving surface.

In this case the band remains stationary for the complete pressing stage. The process terminates with the manual or mechanical extraction of the solidly welded band.

The above-mentioned traditional presses has many inconveniences, including:

- a lengthy working time period due to the sum of the: insertion of the piece, the downward movement of the moving part, the actual pressing time, the upward movement of the moving part or the two-way traverse of the pressing carriage and the extraction of the piece;
- the requirement of using considerable force due to the need to apply the correct pressure during the gluing operation on the entire joining surface;
- a certain intrinsic danger of the working system which makes the use of uncomfortable safety devices advisable, thus making the work more difficult and less productive.

The present invention seeks to obviate the above-mentioned inconveniences by producing a joining machine for continuous loop abrasive bands comprising a structure that permits the assembly work to be done inside the structure itself and a device, mounted on the structure, which is able to provide the necessary compression for joining of the surfaces that are to be glued, by means of rotating elements that convey the piece during the working process until the expulsion of the same at the end of the operation, thus eliminating idle time.

BRIEF DESCRIPTION OF THE DRAWINGS

Embodiments of the invention will now be described, by way of example only, with reference to the accompanying drawings, wherein.

DESCRIPTION OF THE PREFERRED EMBODIMENTS

Figure 1:
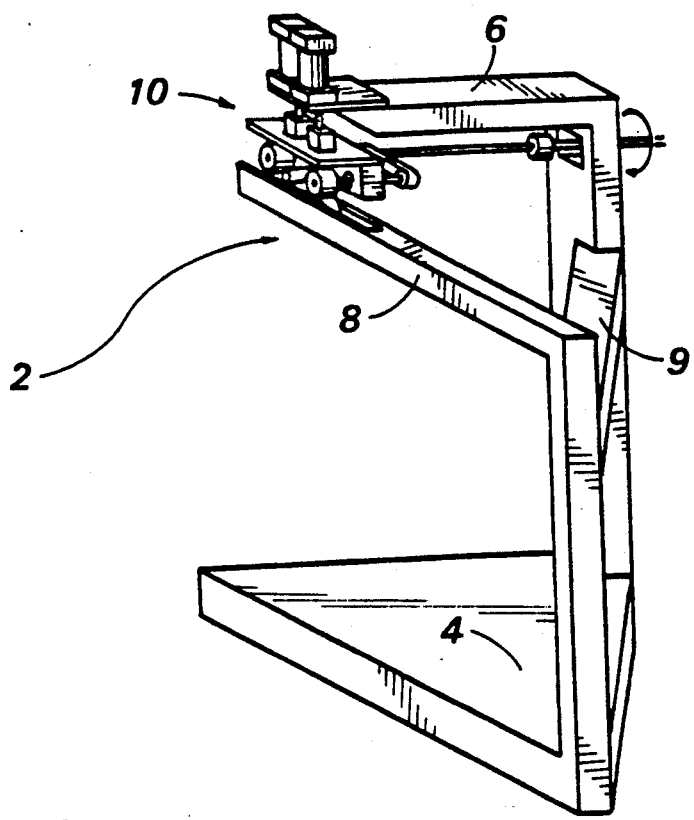
FIG. 1 is a prospective view of the joining machine in accordance with the present invention.

With reference to the drawings, FIG. 1 presents an overall view of the machine 2 including a base 4 and two inverted L-shaped arms 6 and 8 which are integral with the base and rigidly connected by the cross-member 9; the arms may be parallel to one another, orthogonal or skewed and in the illustrated example they are placed orthogonally.

Figure 2:
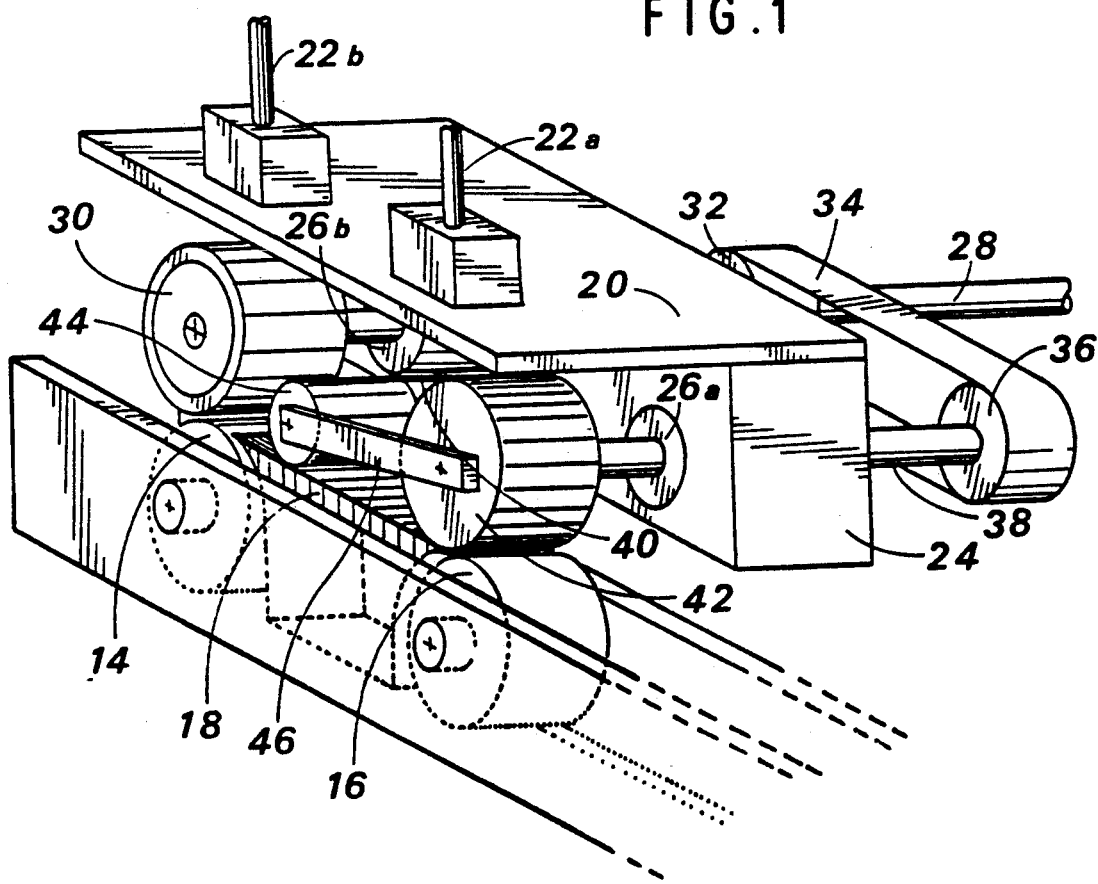
FIG. 2 is a prospective and enlarged view of the device with the rotating elements of the machine of FIG. 1.
Figure 3:
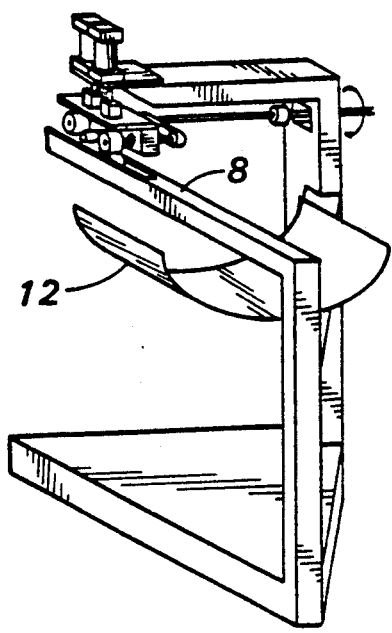
FIGS. 3, 4, 5 and 6 are views of the machine showing various operating phases.
Figure 4:
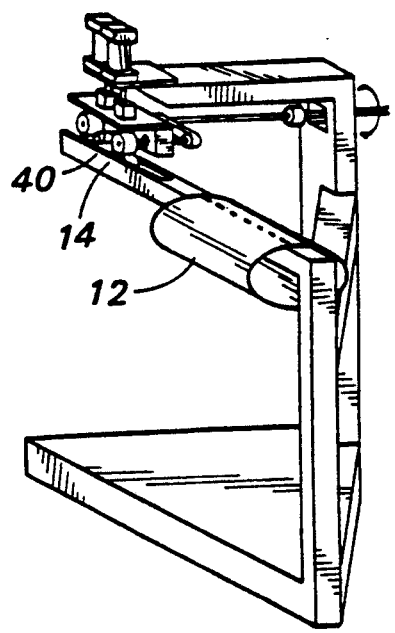
Figure 5:
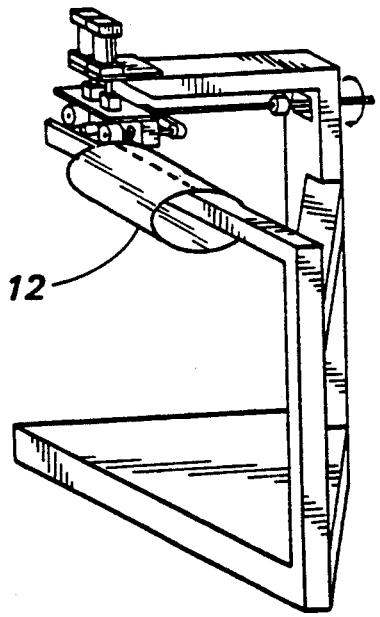
Figure 6:
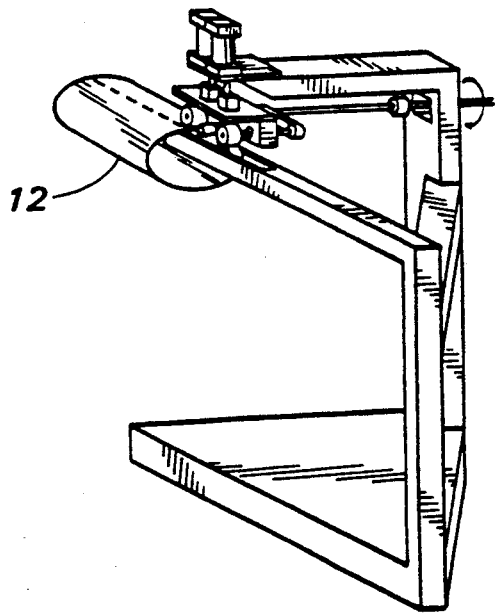

The upper arm 6 serves to bear compressing device including the rotating elements 10 and is shown in greater detail in FIG. 2, while the lower arm 8, in addition to allowing the assembly of the abrasive ring or band on it (indicated be reference number 12 in FIGS. 3, 4, 5, and 6) acts as a support, in its horizontal part, for the two idler rollers 14, 16 between which a heating sliding-shoe 18 is housed, as shown in FIG. 2. Element 10, carried to the end of the horizontal part of the upper arm 6, consists of a movable plate 20 to which the ends of the rod of the two pneumatic cylinders 22a and 22b are anchored; the latter function as actuators for generating the pressing force which is applied between the device with the rotating element 10 mounted on the upper arm and the idler rollers borne by the lower arm.

The plate 20 is integral with a supporting base 24 which has two parallel bearings 26a and 26b. Bearing 26b is traversed by a drive shaft 28 on which a pressure roller 30 is splined, the surface of the latter being coated with a consumable tread made of suitably hard material to guarantee a uniform distribution of the pressure along the contact surface, without compromising the integrity of the abrasive material with which it will be in contact e.g. (soft rubber technopolymer or other) material.

Splined on the same drive shaft, driven by a geared motor mounted on the structure, is the driving pulley 32 which transmits movement, by means of a belt 34 and a driven pulley 36, to a driven shaft 38, which passes through the bearing 26a. The shaft 38 causes rotation of a secondary belt 40 which acts as a conveyor for the material that has to be treated.

The belt 40 is held in position by a pulley 42 and by the idle driving roller 44 articulated to the driven shaft 38 by connecting rod 46.

The above described machine works, as illustrated schematically in FIGS. 3, 4, 5 and 6, in the following manner: the operator places the abrasive band 12 under the horizontal part of the lower arm 8. assembles the ring around the arm lining up the suitably treated surfaces and then pushes the ring obtained in this manner between the belt 40 and the idler roller 14 so that the area to be joined is aligned with the direction of movement set by the previously described rollers.

The ring then continues its advance, being pulled along the rollers without slopping, as a stationary band pressing period is not necessary, thus permitting the operator to begin the assembly stage of another band.

It will be possible to furnish the machine with various technically known equipment such as those relative to applying a reinforcement film, gluing of the reinforcement film and the heat treatment of pre-glued or heatactivatable reinforcement film. The machine in question may also be used for the assembly of the band without the final pressing step.

I claim:

1. A joining machine for continuous loop abrasive bands, which comprises:
   a support structure including a base and a reinforcing cross-member; a first and second arm connected to one of said base and said cross-member;
   a compressing device;
   first rotating means mounted on the first arm and second rotating means mounted on the second arm for exerting compression joining of surfaces of an object to be glued and for conveying the abrasive bands;
   heating means positioned between said first and second rotating means; and
   driving means for transmitting rotational movement to at least one of said first and second rotating means.

2. A machine according to claim 1, in which said first and second arms comprise inverted L-shaped arms.

3. A machine according to claim 1, in which said driving means comprise a driving shaft supported by the said first bearing, a driven shaft supported by said second bearing, a driving pulley connected to said driving shaft for transmitting movement, by means of a belt and a driven pulley, to said driven shaft.

4. A machine according to claim 1, in which said first rotating means comprises a roller coated with a consumable tread connected to said driving shaft and a pair rollers which engage a belt for leading the abrasive band said pair of rollers being connected to said driven shaft.

5. A machine according to claim 1 in which said second rotating means comprise two idler rollers between which said heating means is housed.

6. A machine according to claim 1 in which said heating means comprises a guide block which is heated by friction.

7. A machine according to claim 1, in which said first upper arm and said second lower are positioned orthogonally to one another.

8. A machine according to claim 1, in which said first upper arm and said second lower arm are positioned parallel to one another.

9. A machine according to claim 1, in which said first upper arm and said second lower arm are positioned skewed with respect to one another.

10. A machine according to claim 1, in which said compressing device comprise a movable plate connected to supporting means containing a first and a second bearing for said driving means.

11. A machine according to claim 10, in which said movable plate supports ends of a rod of two pressing pneumatic cylinders for generating a pressing force which is applied between said first rotating means and said second rotating means.

* * * * *